United States Patent
Xie et al.

(10) Patent No.: US 9,723,160 B2
(45) Date of Patent: Aug. 1, 2017

(54) SHEET CONVEYOR

(71) Applicant: Brother Kogyo Kabushiki Kaisha, Nagoya (JP)

(72) Inventors: Tianjin Xie, Nagoya (JP); Takashi Fujiwara, Nagakute (JP); Yusaku Seki, Nagoya (JP); Yukihiko Sato, Nagakute (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 15/133,491

(22) Filed: Apr. 20, 2016

(65) Prior Publication Data

US 2016/0309046 A1   Oct. 20, 2016

(30) Foreign Application Priority Data

Apr. 20, 2015 (JP) ................. 2015-085721

(51) Int. Cl.
   *B65H 5/22* (2006.01)
   *H04N 1/00* (2006.01)
   *B65H 1/04* (2006.01)
   *B65H 31/02* (2006.01)

(52) U.S. Cl.
   CPC ............. *H04N 1/0032* (2013.01); *B65H 1/04* (2013.01); *B65H 31/02* (2013.01); *H04N 1/0057* (2013.01); *H04N 1/00554* (2013.01); *B65H 2301/4212* (2013.01); *B65H 2405/1111* (2013.01); *B65H 2405/1112* (2013.01); *B65H 2405/1114* (2013.01); *B65H 2405/11151* (2013.01); *B65H 2405/3321* (2013.01); *B65H 2601/325* (2013.01); *B65H 2801/39* (2013.01); *H04N 2201/0094* (2013.01)

(58) Field of Classification Search
   CPC .... B65H 2405/1111; B65H 2405/1112; B65H 2405/1114
   See application file for complete search history.

(56) References Cited

U.S. PATENT DOCUMENTS

D521,544 S  *  5/2006  Saito ............................. D18/39
D526,345 S  *  8/2006  Motoyoshi .................... D18/39
(Continued)

FOREIGN PATENT DOCUMENTS

JP            4013159 B2   11/2007
JP         2008-133077 A    6/2008

*Primary Examiner* — Howard Sanders
(74) *Attorney, Agent, or Firm* — Burr & Brown, PLLC (57) ABSTRACT

A sheet conveyor includes: a sheet conveyor; a supporter including a movable guide and having a first and second end portions in a widthwise direction; and a first cover adjacent to the first end portion. The supporter has an upstream edge in the conveying direction. A first-end upstream end portion of the upstream edge is nearer to the sheet conveyor than a second-end upstream end portion of the upstream edge. The first cover has a first region and a second region. The first region has a height greater than or equal to that of the guide and extends to a position located upstream of an upstream, end portion of the guide. The second region is located upstream of the first region, and the second region is less in height than the first region. The first-end upstream end portion overlaps the first region when viewed in the widthwise direction.

19 Claims, 9 Drawing Sheets

(56) References Cited

U.S. PATENT DOCUMENTS

| | | | |
|---|---|---|---|
| 7,401,879 B2 * | 7/2008 | Isono | B41J 13/14 347/16 |
| 2002/0185809 A1 * | 12/2002 | Horiguchi | B65H 31/02 271/207 |
| 2007/0007716 A1 * | 1/2007 | Tanaka | B65H 31/02 271/207 |

* cited by examiner

SHEET CONVEYOR

CROSS REFERENCE TO RELATED APPLICATION

The present application claims priority from Japanese Patent Application No 2015-085721, which was filed on Apr. 20, 2015, the disclosure of which is herein incorporated by reference in its entirety.

BACKGROUND

Technical Field

The following disclosure relates to a sheet conveyor.

Description of the Related Art

There are known image reading apparatuses including an automatic document feeder (ADF). The ADF is provided with a sheet supporter which supports a sheet to be conveyed by the ADF. Such a sheet supporter includes: a support member having a support surface for supporting sheets; and guide members provided on the support surface so as to be movable in the widthwise direction of the sheets.

When a user uses the ADF and causes the image reading apparatus to read an image formed on the sheet, the user places the sheet on an upper surface of the support member and moves the guide members in accordance with the width of the sheet. The user then operates an operation panel to instruct a start of reading.

SUMMARY

In the case of the above-described ADF, however, the support member and the guide members are exposed to a front side of the ADF. The user normally stands in front of the ADF and operates and instructs the image reading apparatus to read an image formed on the sheet. Thus, when the user places a sheet on the support member of the ADF or takes the sheet conveyed by the ADF and scanned by the image reading apparatus, a hand of the user or the sheet easily gets caught on the exposed support member or guide members, making it difficult for the user to perform operations.

Accordingly, an aspect of the disclosure relates to a sheet conveyor with improved workability of placing or taking a sheet.

In one aspect of the disclosure, a sheet conveyor includes: a sheet conveyor configured to convey a sheet in a conveying direction; a supporter including (i) a support surface disposed upstream of the sheet conveyor in the conveying direction and configured to support the sheet to be conveyed by the sheet conveyor and (ii) a guide provided nearer to the sheet conveyor than an upstream edge of the support surface in the conveying direction, the guide being movable in a widthwise direction perpendicular to the conveying direction, the supporter having a first end portion and a second end portion in the widthwise direction, the guide having an upstream end portion in the conveying direction; and a first cover adjacent to the first end portion of the supporter and extending in the conveying direction. The supporter has an upstream edge in the conveying direction. A first-end upstream end portion of the upstream edge of the supporter corresponds to the first end portion, and a second-end upstream end portion of the upstream edge of the supporter corresponds to the second end portion. The first-end upstream end portion is located nearer to the sheet conveyor than the second-end upstream end portion. The first cover has a first region and a second region. A height of a portion of an upper end of the first region is greater than or equal to that of an upper end of the guide, and the first region extends to a position located upstream of the upstream end portion of the guide in the conveying direction. The second region is located upstream of the first region in the conveying direction, and a height of an upper end of the second region is less than that of the upper end of the first region. The first-end upstream end portion of the upstream edge of the supporter overlaps the first region of the first cover when viewed in the widthwise direction.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIGS. 10A and 10B are partially enlarged views for explaining a positional relationship between the supply tray and a protrusion, wherein FIG. 10A illustrates the state in which the supply tray is located at the second position, and FIG. 10B illustrates the state in which the supply tray is located at the first position; and FIGS. 11A and 11B are partially enlarged views for explaining a positional relationship between the supply tray and the protrusion in a modification, wherein FIG. 11A illustrates the state in which the supply tray is located at the second position, and FIG. 11B illustrates the state in which the supply tray is located at the first position.

DETAILED DESCRIPTION OF THE EMBODIMENT

Hereinafter, there will be described one embodiment by reference to the drawings.

Configuration of MFP

Figure 1:
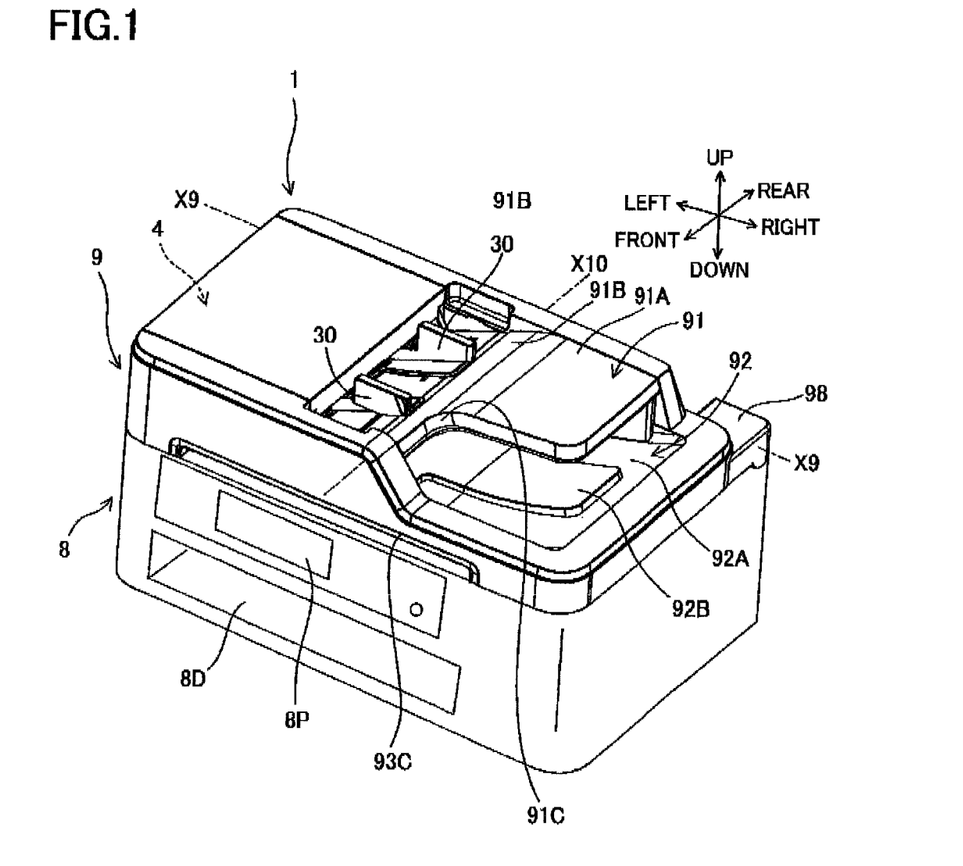
FIG. 1 is a perspective view illustrating an external appearance of a multi-function peripheral (MFP)

FIG. 1 illustrates a multi-function peripheral (MFP) 1. In the following explanation, a front side is defined by assuming that a front surface of the MFP 1 is a surface thereof on which an operation panel 8P illustrated in FIG. 1 is provided. A left side is defined by assuming that a left surface of the MFP 1 is a surface thereof when the MFP 1 is viewed from a position located in front of the front surface of the MFP 1. The other sides are defined with respect to these front side and left side. There will be described components and devices of the MFP 1.

It is noted that the right side is one example of an upstream side in a conveying direction in which a sheet is conveyed, and the left side is one example of a downstream side in the conveying direction. Also, the front and rear direction is one example of a widthwise direction. One side in the widthwise direction is one example of a front side, and the other side in the widthwise direction is one example of the other side.

Overall Configuration

Figure 2:
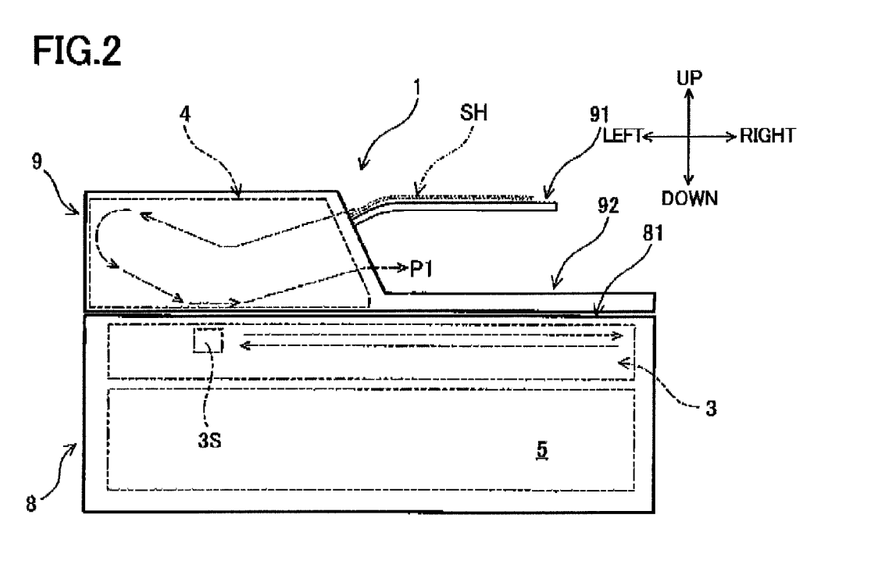
FIG. 2 is a schematic view for explaining a construction of the MFP.

As illustrated in FIGS. 1 and 2, the MFP 1 includes a main body 8, an opening and closing member 9, an image forming unit 5, a reading unit 3, and a sheet conveyor 4 according to the present embodiment. The main body 8 is substantially shaped like a flat box. As illustrated in FIG. 1, the operation panel 8P is provided on a front surface of the main body 8. One example of the operation panel 8P is a touch screen. The MFP 1 has a sheet discharge portion 8D at its lower portion below the operation panel 8P. A recording sheet on which an image is formed by the image forming unit 5 is discharged onto the sheet discharge portion 8D.

As illustrated in FIG. 2, the image forming unit 5 is provided in a lower portion of the main body 8. The image forming unit 5 records an image on a sheet SH. Examples of the image forming unit 5 include an ink-jet recording device and a laser recording device. As illustrated in FIG. 2, the reading unit 3 is provided in an upper portion of the main body 8. The reading unit 3 reads an image formed on the sheet SH. The sheet conveyor 4 is provided in the opening and closing member 9. The opening and closing member 9 includes a supply tray 91 capable of supporting a plurality of the sheets SH. The sheet conveyor 4 conveys the sheets SH one by one from the supply tray 91 along a conveyance path P1. During this conveyance, the reading unit 3 reads an image formed on the sheet SH.

As illustrated in FIG. 1, hinges 98 are provided an upper end of a rear pardon of the main body 8 (FIG. 1 illustrates only one of the hinges 98). The opening and closing member 9 is supported by the hinges 98 so as to be pivotable (swingable) about an opening and closing axis X9 extending in the right and left direction. In a state in which the opening and closing member 9 is closed as illustrated in FIGS. 1 and 2, the opening and closing member 9 covers an upper surface of a platen glass 81 for supporting a reading object. Though not illustrated, the opening and closing member 9 is swung about the opening and closing axis X9 such that a front end portion of the opening and closing member 9 moves upward and rearward. With this movement, the opening and closing member 9 is positioned at an open position at which the platen glass 81 is exposed. This position of the opening and closing member 9 allows a user to place a reading object onto the platen glass 81.

As illustrated in FIG. 2, the reading unit 3 includes: a reading sensor 3S provided in an upper portion of the main body 8; and a scanning mechanism, not illustrated. The scanning mechanism is provided in the main body 8 and reciprocates the reading sensor 3S in the right and left direction under the platen glass 81. When reading an image formed on the reading object supported on the platen glass 81, the reading sensor 3S reads the image while reciprocating under the platen glass 81. When reading an image formed on the sheet SH being conveyed by the sheet conveyor 4, the reading sensor 3S is stopped at a stationary reading position located under the platen glass 81. Well-known image reading sensors may be used for the reading sensor 3S, examples of which include a contact image sensor (CIS) and a charge coupled device (CCD).

As illustrated in FIGS. 1-8, the opening and closing member 9 includes the supply tray 91 and a discharge tray 92.

The supply tray 91 is provided at a right portion of the opening and closing member 9. The supply tray 91 is capable of supporting a plurality of the sheets SH to be conveyed by the sheet conveyor 4 and read by the reading sensor 3S. Specifically, an upper surface of the supply tray 91 supports the sheets SH. In this respect, this upper surface may be referred to as a support surface. This support surface has a first area 91A and a second area 91B. The first area 91A is a flat surface located at a right portion of the supply tray 91. The second area 91B is a surface continuous to a left end of the first area 91A. The second area 91B is curved or inclined downward toward the sheet conveyor 4. The supply tray 91 is one example of a supporter. Each of the first area 91A and the second area 91B is one example of a support surface.

As illustrated in FIGS. 1 and 2, two guides 30 are provided on the supply tray 91 so as to be slidable in the front and rear direction. The guides 30 are opposed to each other in the front and rear direction and coupled to each other by a rack-and-pinion mechanism, not illustrated. The front guide 30 and the rear guide 30 are moved toward and away from each other in the front and rear direction. With this movement, the guides 30 may come into contact with various sizes of the sheets SH supported on the supply tray 91. The front and rear direction is one example of the widthwise direction perpendicular to the sheet conveying direction.

Figure 5:
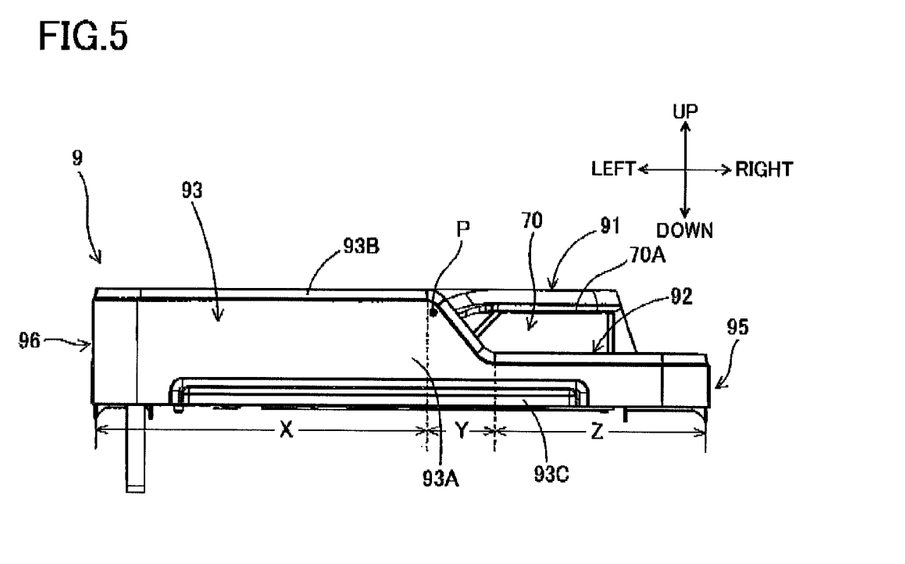
FIG. 5 is a front elevational view of the ADF, with the supply tray located at the first position.
Figure 6:
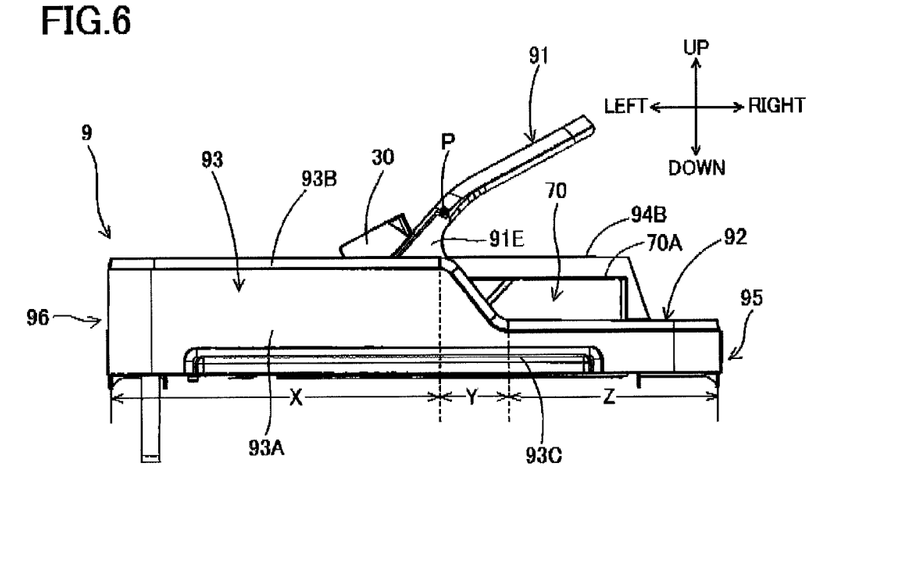
FIG. 6 is a front elevational view of the ADF, with the supply tray located at the second position.
Figure 7:
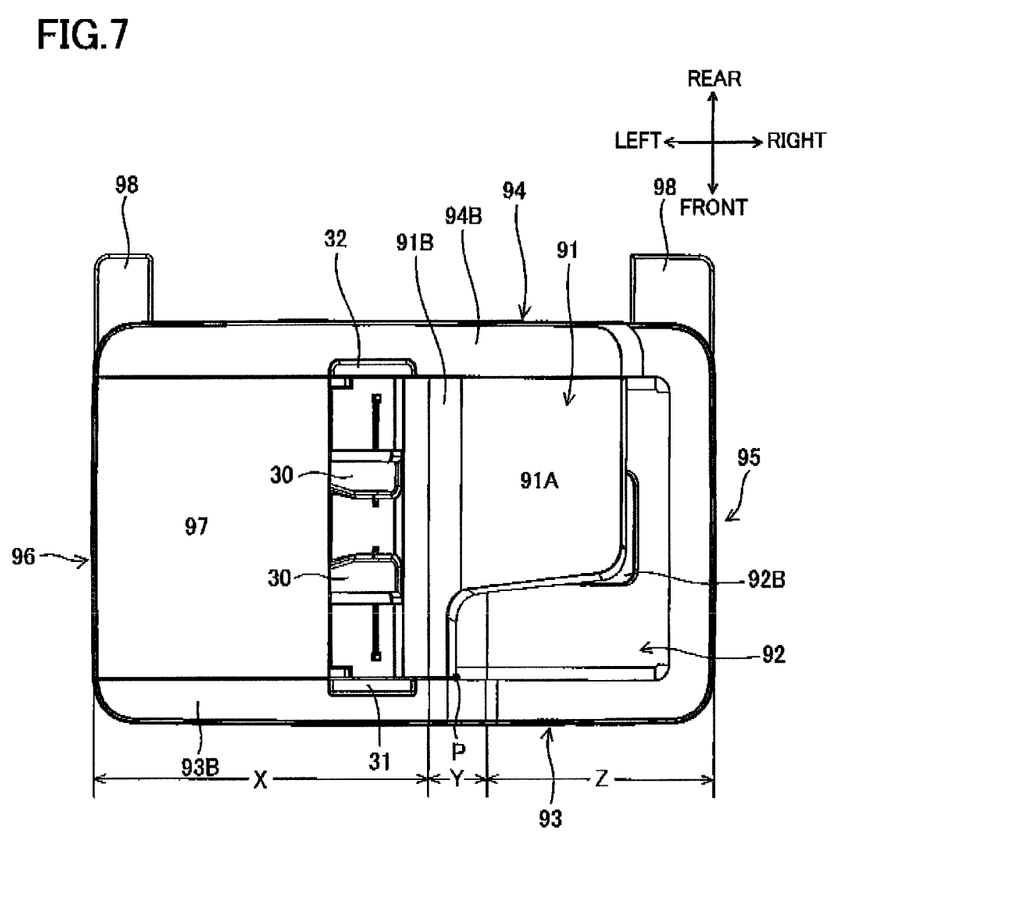
FIG. 7 is a top view of the ADF.

As illustrated in FIGS. 1-8, the discharge tray 92 is provided under the supply tray 91. An upper surface of the discharge tray 92 is capable of supporting the sheets SH stacked on each other, that is, the upper surface serves as a discharge surface 92A. Specifically, the sheets SH are discharged onto the discharge surface 92A by the sheet conveyor 4 after an image formed on each of the sheets SH is read by the reading sensor 3S. The discharge surface 92A is inclined so as to be higher at its right portion than at its left portion. A protruding area 92B is formed at a central portion of the discharge surface 92A in the front and rear direction. The protruding area 92B extends rightward from a position near an opening that is formed in the sheet conveyor 4 for discharging the sheet SH. The length of the protruding area 92B in the widthwise direction is less than the length of a sheet SH of the A5 size in its longitudinal direction, for example. As illustrated in FIG. 7, a right end of the protruding area 92B is located to the right of a right end of the supply tray 91. With this construction, the protruding area 92B supports a central portion of the sheet SH discharged from the sheet conveyor 4. In the case where the size of a discharged sheet is greater than the A5 size in the longitudinal direction, for example, opposite ends of the sheet SH in the widthwise direction are floated over the discharge surface 92A by an amount corresponding to the height of the protruding area 92B. This construction allows the user to reach under the sheet SH, which facilitates taking the sheet SH from the discharge tray 92.

Figure 3:
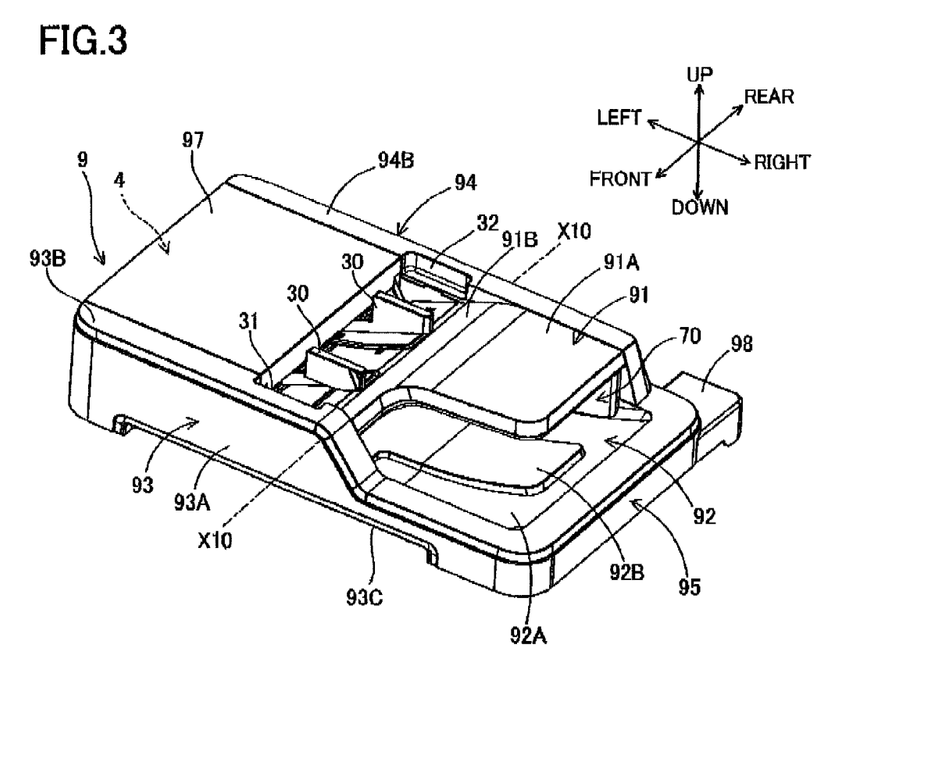
FIG. 3 is a perspective view illustrating an external appearance of an automatic document feeder (ADF), with a supply tray located at a first position.
Figure 4:
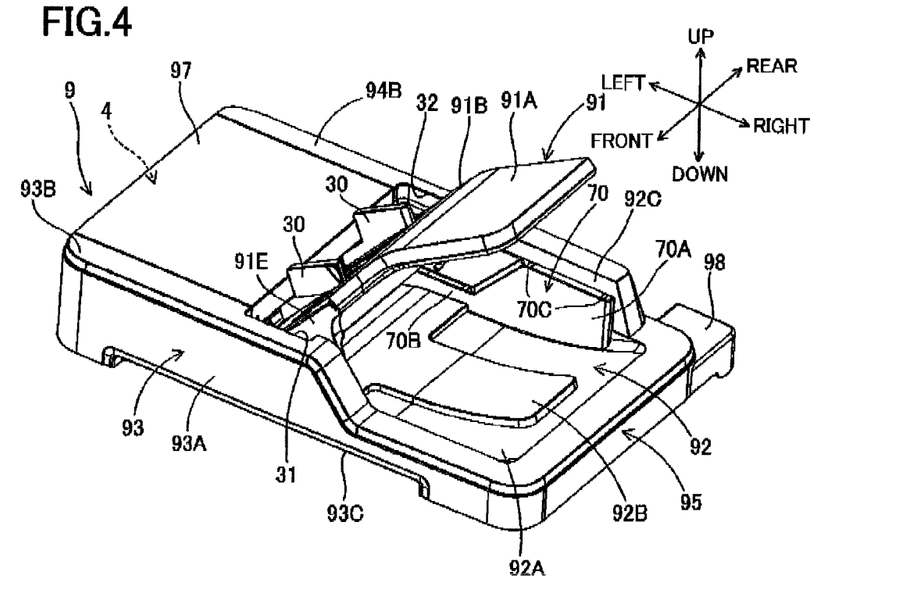
FIG. 4 is a perspective view illustrating an external appearance of the ADF, with the supply tray located at a second position.
Figure 8:
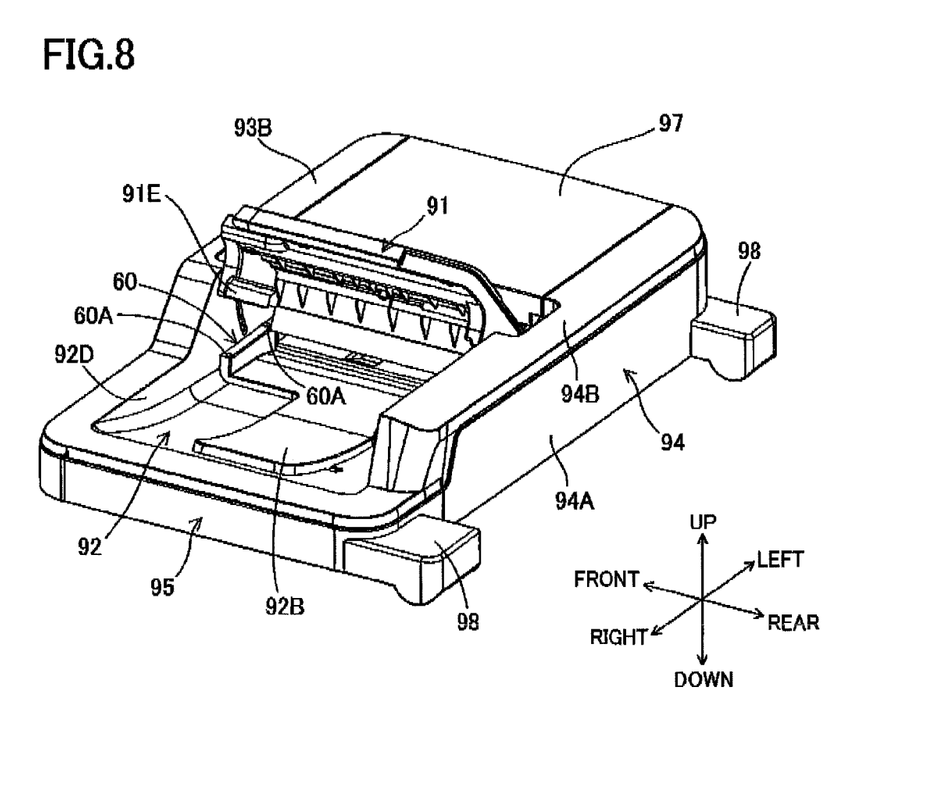
FIG. 8 is a perspective view of the ADF for explaining an upper surface of a discharge tray.

As illustrated in FIGS. 4, 6, and 8, for example, the supply tray 91 is supported by the opening and closing member 9 so as to be pivotable (swingable) about a pivot axis X10. As illustrated in FIG. 1, the pivot axis X10 extends in the front and rear direction near a left end of the supply tray 91. The supply tray 91 includes hinges, not illustrated, provided near a left end of the supply tray 91 so as to respectively extend frontward and rearward. These hinges are supported by the opening and closing member 9, enabling the supply tray 91 to be swung about the pivot axis X10. Specifically, the supply tray 91 is movable between a first position illustrated in FIGS. 3 and 5 and a second position illustrated in FIGS. 4 and 6. When the supply tray 91 is located at the first position, the sheet SH may be conveyed to the sheet conveyor 4. When the supply tray 91 is swung to the second position, a space over the discharge tray 92 is exposed. At this second position, the user easily recognizes the sheet SH discharged on the discharge tray 92, making it easy for the user to take the sheet SH from the discharge tray 92. The supply tray 91 is swung between the first position and the second position by the user. When the user takes his or her hand off the supply tray 91 located at the second position, the supply tray 91 is moved to the first position by its own weight.

A front portion of the supply tray 91 is cut out so as to form a cutout 91C. As illustrated in, e.g., FIG. 7, a starting point P of the cutout 91C is defined on a front end of the supply tray 91 at a position located to the right of the guides 30. Also, this starting point P (as one example of a first-end upstream end portion) is located within the second area 91B of the upper surface of the supply tray 91. The front end of the supply tray 91 is one example of a first end portion in the widthwise direction. A rear end of the supply tray 91 is one example of a second end portion in the widthwise direction.

As illustrated in FIG. 7, an edge of the supply tray 91 which defines the cutout 91C extends substantially straight in the rear direction from the starting point P, is then curved to the right, and finally extends substantially straight to a right edge of the supply tray 91. Here, the guides 30 illustrated in FIG. 7 are located at positions corresponding to the width of the sheet SH of the smallest size which may be conveyed by the sheet conveyor 4 in the present embodiment. A position at which the cutout 91C is curved is located at the rear of a front one of the guides 30 as illustrated in FIG. 7. More specifically, when the guides 30 guide the sheet SH in the widthwise direction, the position at which the cutout 91C is curved is located at the rear of a portion of the front guide 30 which contacts a front edge of the sheet SH. This cutout 91C forms a large space for exposing the upper surface of the discharge tray 92.

This construction increases viewability of the sheet SH discharged on the upper surface of the discharge tray 92. Also, a left end of the cutout 91C is contiguous to the second area 91B of the supply tray 91. This second area 91B is inclined downward from the flat first area 91A toward the sheet conveyor 4. The distance between a lower surface of the supply tray 91 and the upper surface of the discharge tray 92 is less at the second area 91B than at the first area 91A. However, the cutout 91C is contiguous to the second area 91B as described above. Thus, even in the case where the sheet SH of a small size is discharged to a portion of the discharge tray 92 with a narrow upper space, the user may easily place his or her hand on the discharge tray 92 to take the sheet SH.

The sheet conveyor 4 includes: a guide surface formed by a chute, not illustrated, provided in the opening and closing member 9; guide surfaces and guide ribs formed on inner surfaces of various covering members of the opening and closing member 9; and the conveyance path P1 defined by conveying rollers and other conveying components. As schematically illustrated in FIG. 2, the conveyance path P1 first extends leftward from the supply tray 91. The conveyance path P1 is then curved downward, then inclined downward toward the platen glass 81, and then extends rightward along the platen glass 81. The conveyance path P1 finally extends rightward so as to be inclined upward toward the discharge tray 92. It is noted that the reading sensor 3S is provided at the stationary reading position under the portion of the conveyance path P1 which extends rightward along the platen glass 81. This position is a reading point for the reading sensor 3S in the conveyance path P1.

The conveying direction in which the sheet SH is conveyed by the sheet conveyor 4 is the left direction at the upper portion of the conveyance path P1 illustrated in FIG. 2. The conveying direction changes from the left direction to the right direction in the downwardly curved portion of the conveyance path P1. The conveying direction is the right direction at the lower portion of the conveyance path P1 which passes through the reading point and extends toward the discharge tray 92. It is noted that the shape and directions of the conveyance path P1 are not limited to those described above.

Construction of Covers

There will be next explained the opening and closing member 9 in detail. As illustrated in FIGS. 3-8, the opening and closing member 9 includes a front cover 93, a rear cover 94, a right cover 95, a left cover 96, and an upper cover 97.

The front cover 93 is located in front of the sheet conveyor 4, the supply tray 91, and the discharge tray 92 so as to cover these components. The front cover 93 includes: a first cover 93A extending in the up and down direction and serving as an exterior wall of the opening and closing member 9; and a second cover 93B continuous to an upper end of the first cover 93A. A lower end of the first cover 93A extends from a left end portion to a right end portion of the opening and closing member 9. The lower end of the first cover 93A is recessed at its central portion so as to form a recess serving as a handle 93C. As illustrated in FIG. 1, this recess and the operation panel 8P are located in generally the same area in the right and left direction. The front cover 93 is one example of a first cover.

As illustrated in FIGS. 5, 6, and 7, the first cover 93A (the front cover 93) is divided into a first region X, a second region Z, and a third region Y in the right and left direction. The third region Y is located between the first region X and the second region Z. The first region X extends from the left end portion of the opening and closing member 9 (i.e., from a position located downstream of downstream end portions (in the conveying direction) of the guides 30 in the conveying direction) to a position located to the right of right ends of the respective guides 30 (i.e., upstream end portions (in the conveying direction) of the guides 30 in the conveying direction). The third region Y extends from a right end of the first region X to a position located to the right of the starting point P of the cutout 91C formed in the supply tray 91. A right end of the third region Y overlaps the first area 91A of the supply tray 91 located at the first position in the front and rear direction (when viewed in the up and down direction). The second region Z extends from the right end of the third region Y to the right end portion of the opening and closing member 9. The height of the front cover 93 from its lower end varies among the first region X, the second region Z, and the third region Y. Specifically, the first region X is higher than the second region Z. The height of the third region Y decreases from the first region X toward the second region Z so as to connect between the first region X and the second region Z. That is, the height of an upper end of the third region Y is lower than the height of an upper end of the first region X and higher than the height of an upper end of the second region Z. The third region Y is inclined downward from a downstream side toward an upstream side in the conveying direction such that the height of the supply tray 91 at the position corresponding to the starting point P is higher than the height of the starting point P.

The second cover 93B is disposed on an upper end of the first cover 93A. The second cover 93B has a surface extending in the up and down direction and a surface extending horizontally rearward from an upper end of the surface extending in the up and down direction. The surface of the second cover 93B which extends in the up and down direction has the constant width in the up and down direction from a left end portion to a right end portion of the second cover 93B. The surface of the second cover 93B which extends in the up and down direction is flush with the first cover 93A. The surface of the second cover 93B which extends horizontally rearward serves as an upper surface of the front cover 93 and forms a portion of an upper surface of the opening and closing member 9. Thus, the upper surface of the front cover 93 is higher at the first region X than at the second region Z and is inclined from the first region X toward the second region Z at the third region Y.

As illustrated in FIG. 8, the rear cover 94 is located at the rear of the sheet conveyor 4, the supply tray 91, and the discharge tray 92 so as to cover these components. The rear cover 94 includes: a third cover 94A extending in the up and down direction and serving as an exterior wall of the opening and closing member 9; and a fourth cover 94B continuous to an upper end of the third cover 94A. A lower end of the third cover 94A extends from the left end portion to the right end portion of the opening and closing member 9. The hinges 98 are provided respectively on right and left end portions of the third cover 94A. The height of the third cover 94A from its lower end is constant within an area extending from the left end portion of the third cover 94A to a position near the right end portion of the third cover 94A. The right end portion of the third cover 94A is inclined downward. The rear cover 94 is one example of a second cover.

The fourth cover 94B is disposed on an upper end of the third cover 94A. The fourth cover 94B has a surface extending in the up and down direction and a surface extending horizontally frontward from an upper end of the surface extending in the up and down direction. The surface of the fourth cover 94B which extends in the up and down direction has the constant width in the up and down direction from a left end portion to a right end portion of the fourth cover 94B. The surface of the fourth cover 94B which extends in the up and down direction is flush with the third cover 94A. The surface of the fourth cover 94B which extends horizontally frontward serves as an upper surface of the rear cover 94 and forms a portion of the upper surface of the opening and closing member 9.

As illustrated in FIGS. 3 and 8, for example, the right cover 95 extends downward from a left edge of the discharge tray 92 and serves as an exterior wall of the opening and closing member 9. A lower end of the right cover 95 extends from a rear end portion to a front end portion of the opening and closing member 9. The left cover 96 is located to the left of the sheet conveyor 4 so as to cover the sheet conveyor 4. Though not illustrated, the left cover 96 extends in the up and down direction and serves as an exterior wall of the opening and closing member 9. A lower end of the left cover 96 extends from the rear end portion to the front end portion of the opening and closing member 9.

As described above, the front cover 93, the rear cover 94, the right cover 95, and the left cover 96 serve as side walls (the exterior walls) of the opening and closing member 9. Though not explained in detail, as illustrated in FIGS. 3, 7, and 8, these covers are coupled to each other by curved side walls (exterior walls) without spaces therebetween.

An upper portion of the sheet conveyor 4 is covered with the upper cover 97. The upper cover 97 is a rectangular cover having a flat upper surface.

Here, there will be explained a height relationship among the front cover 93, the rear cover 94, the right cover 95, the left cover 96, the upper cover 97, and the supply tray 91 of the opening and closing member 9. As illustrated in FIGS. 3, 7, 8, and 9, the upper cover 97 is located between the front cover 93 and the rear cover 94. Specifically, the upper cover 97 is located between the upper surface of the second cover 93B of the front cover 93 and the upper surface of the fourth cover 94B of the rear cover 94. These upper surfaces are located at the same height and in the same plane. The first area 91A of the upper surface of the supply tray 91 and the upper surface of the fourth cover 94B of the rear cover 94 are located at the same height and in the same plane. That is, the upper surface of the second cover 93B of the front cover 93, the upper surface of the fourth cover 94B of the rear cover 94, the upper cover 97, and the first area 91A of the upper surface of the supply tray 91 are located at the same height and in the same plane. It is noted that small steps due to manufacturing errors in components and errors in assembly are regarded as the same plane.

Figure 9:
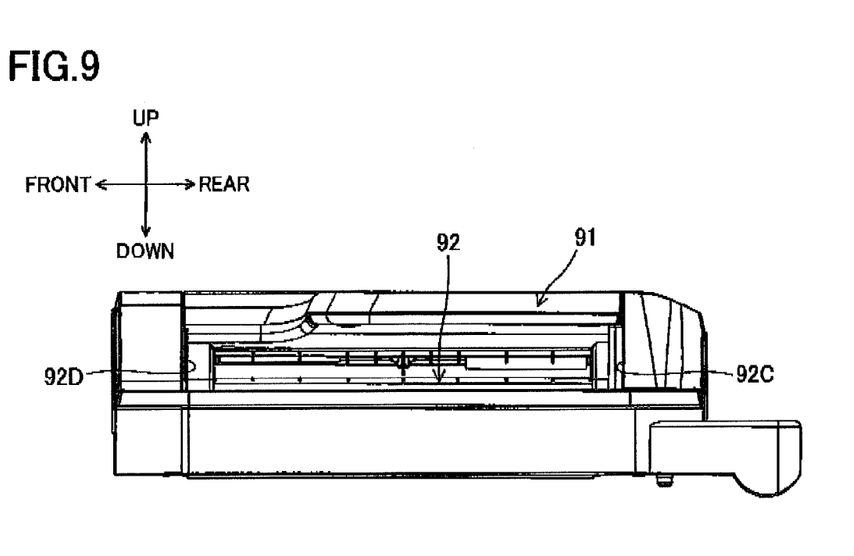
FIG. 9 is a side view of the ADF when the ADF is viewed from a right side thereof.

The guides 30 provided on the supply tray 91 are surrounded by the upper surface of the second cover 93B of the front cover 93, the upper surface of the fourth cover 94B of the rear cover 94, the upper cover 97, and the first area 91A of the supply tray 91. These upper surfaces and upper ends of the guides 30 are located at the same height, or the upper ends of the guides 30 are located below the upper surfaces. As illustrated in FIGS. 5 and 9, no component protrudes from the upper surface of the opening and closing member 9, and the upper surface of the opening and closing member 9 is flat.

A corner portion of the supply tray 91, which is defined by front and right edges of the supply tray 91, is located at a position, corresponding to the starting point P. As illustrated in FIG. 5, the starting point P is located at a position overlapping the third region Y of the front cover 93 when the opening and closing member 9 is viewed from the front (in the front and rear direction). A front portion of the front and right corner portion of the supply tray 91 is covered with the front cover 93. In the opening and closing member 9 in the present embodiment, the right edge of the supply tray 91 located at the first position has a portion contiguous to the front cover 93, and this portion is substantially flush with the upper surface (the inclined surface) of the second cover 93B at the third region Y.

The cutout 91C is formed in the first area 91A and a right portion of the second area 91B of the supply tray 91. As illustrated in FIG. 5, the cutout 91C is opposed to the second region Z of the front cover 93 when the opening and closing member 9 is viewed from the front (in the front and rear direction). The second region Z is lower in height than each of the first region X and the third region Y. Thus, a large opening is formed between the supply tray 91 and an upper end of the second region Z of the front cover 93. This opening is large also because the cutout 91C is formed in the front end portion of the supply tray 91.

The upper surface of the front cover 93 has a recess 31 formed at a position opposed to the guides 30. The recess 31 is recessed in a direction away from the guides 30 (in the front direction). The upper surface of the rear cover 94 has a recess 32 formed at a position opposed to the guides 30. The recess 32 is recessed in a direction away from the guides 30 (in the rear direction). The recess 31 is one example of a first recess, and the recess 32 is one example of a second recess.

Structure for Supporting Supply Tray

As illustrated in FIGS. 4, 5, 6 and 8, a support member 70 is formed on a rear end portion of the discharge surface 92A of the discharge tray 92. The support member 70 protrudes from the discharge surface 92A toward the lower surface of the supply tray 91. Also, the support member 70 is formed along a side wall 92C standing along and contiguous to a rear edge of the discharge surface 92A. In the present embodiment, the support member 70 is formed integrally with the discharge surface 92A and the side wall 92C. The support member 70 has a first support portion 70A and a second support portion 70B. The first support portion 70A extends in the right and left direction and is located under the first area 91A of the supply tray 91 located at the first position. The second support portion 70B is located to the left of the first support portion 70A and under the second area 91B of the supply tray 91. The second support portion 70B also extends in the right and left direction. The first support portion 70A is higher than the second support portion 70B. An inclined surface is formed between the first support portion 70A and the second support portion 70B.

Projections 70C extending upward are respectively provided on right and left end portions of an upper surface of the first support portion 70A. Likewise, projections 70D extending upward are respectively provided on right and left end portions of an upper surface of the second support portion 70B.

As illustrated in FIG. 8, a support member 60 is formed on a front end of the discharge surface 92A of the discharge tray 92. The support member 60 protrudes from the discharge surface 92A toward the lower surface of the supply tray 91. Also, the support member 70 is formed along a side wall 92D standing along and contiguous to a front edge of the discharge surface 92A. In the present embodiment, the support member 60 is formed integrally with the discharge surface 92A and the side wall 92D. The support member 60 extends in the right and left direction and is located under the second area 91B of the supply tray 91 located at the first position, such that the support member 60 does not overlap the cutout 91C. Protrusions 60A extending upward are respectively provided on right and left end portions of an upper surface of the support member 60. The side wall 92D is one example of a first side wall, and the side wall 92C is one example of a second side wall. Each of the supporters 60, 70 is one example of a protrusion. The support member 60 is one example of a first protrusion (a third portion), and the support member 70 is one example of a second protrusion. The first support portion 70A is one example of a first portion, and the second support portion 70B is one example of a second portion.

Figure 10A:
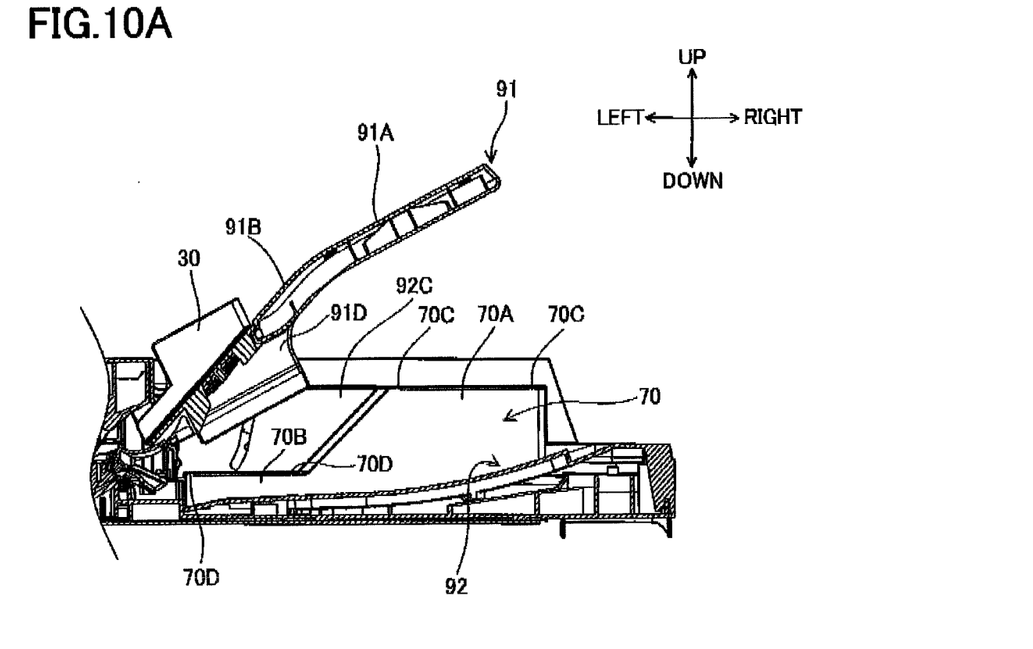
Figure 10B:
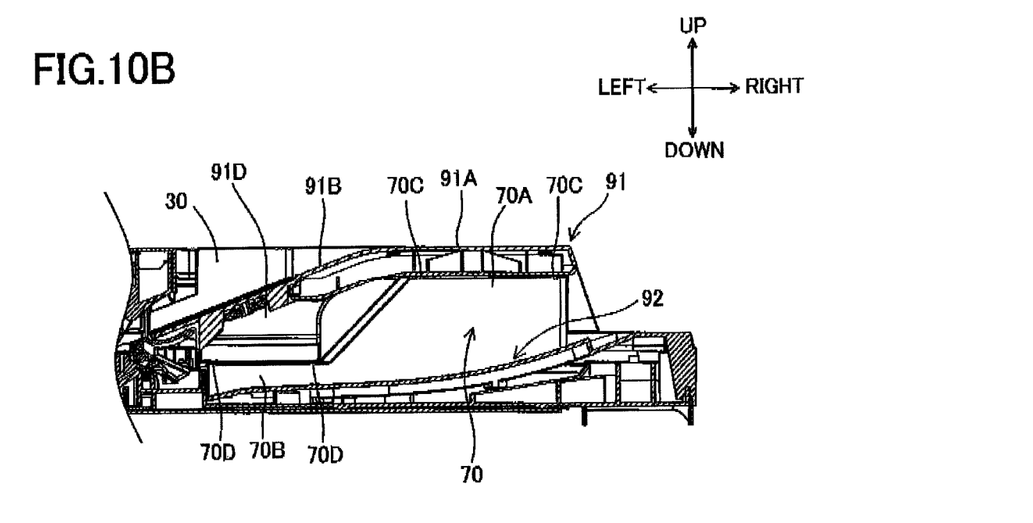

As illustrated in FIGS. 10A and 10B, a rib 91D is provided on a rear end of the lower surface of the supply tray 91. The rib 91B is shaped like a plate and extend toward the discharge tray 92. When the supply tray 91 is swung from the second position illustrated in FIG. 10A to the first position illustrated in FIG. 10B, a lower end of the rib 91D is brought in contact with upper ends of the respective projections 70D provided on the second support portion 70B. In this movement, a portion of the lower surface of the supply tray 91, which portion is the back of the supply tray 91 from the first area 91A, is brought into contact with upper ends of the respective projections 70C provided on the first support portion 70A, so that the portion of the lower surface of the supply tray 91 is positioned.

As illustrated in FIG. 8, a rib 91E is provided on a front end portion of the lower surface of the supply tray 91. The rib 91E is shaped like a plate and extends toward the discharge tray 92. When the supply tray 91 is swung from the second position illustrated in FIG. 8 toward the first position, a lower end of the rib 91E is brought into contact with upper ends of the respective protrusions 60A of the support member 60, so that the lower end of the rib 91E is positioned.

The heights of the support member 60, the first support portion 70A, and the second support portion 70B are set such that when the support member 70 is in contact with the lower surface of the supply tray 91 located at the first position via the protrusions 60a and the projections 70C, 70d, the first area 91A of the upper surface of the supply tray 91 and the upper surface of the rear cover 94 are located at the same height. With this configuration, the lower surface of the supply tray 91 is supported at its front and rear end portions.

Effects

In the MFP 1 as described above, the supply tray 91 of the opening and closing member 9 has the cutout 91C, making it easier for the user to view the sheet SH discharged on the discharge surface 92A of the discharge tray 92. Here, in the case where the cutout 91C is formed, the front and right corner portion of the supply tray 91 is easily exposed to the front surface of the MFR hr the present embodiment, however, the front and right corner portion of the supply tray 91 (near the starting point P) is covered with the front cover 93 from the front. Specifically, the starting point P of the cutout 91C of the supply tray 91 overlaps the third region Y of the front cover 93 when viewed in the front and rear direction. This construction prevents the front and right corner portion of the supply tray 91 from being exposed to the front surface of the MFP. Accordingly, when the user places the sheet onto the upper surface of the supply tray 91 or removes, from the discharge tray 92, the sheet conveyed by the sheet conveyor 4 and scanned by the reading unit 3, it is possible to reduce a possibility that a hand of the user or the sheet gets caught on the front end of the supply tray 91, for example.

The height position of the upper ends of the guides 30 provided on the upper surface of the supply tray 91 is equal to or less than that of the first region X of the front cover 93. Accordingly, when the user places the sheet onto the upper surface of the supply tray 91 or removes, from the discharge tray 92, the sheet conveyed by the sheet conveyor 4 and scanned by the reading unit 3, it is possible to reduce the possibility that the hand of the user or the sheet gets caught on the guides 30. Furthermore, it is possible to reduce components protruding from the upper surface of the opening and closing member 9.

The upper surface of the supply tray 91 includes: the first area 91A extending horizontally; and the second area 91B curved or inclined toward the sheet conveyor 4. This construction may reduce a space occupied by the supply tray 91 in the height direction when compared with the case where the entire supply fray 91 has an inclined surface.

The upper surface of the rear cover 94 and the first area 91A of the supply tray 91 are located at the same height and in the same plane. This construction reduces projections provided on and recesses formed in the upper surface of the opening and closing member 9, thereby simplifying the external appearance of the MFP 1.

The upper cover 97 coveting the upper portion of the sheet conveyor 4, the upper surface of the front cover 93, and the upper surface of the rear cover 94 are located at the same height and in the same plane. This construction further reduces projections provided on and recesses formed in the upper surface of the opening and closing member 9, thereby simplifying the external appearance of the MFP 1.

The recesses 31, 32 are formed respectively in the upper surfaces of the front cover 93 and the rear cover 94. This construction prevents deterioration of the operability of the guides 30 without the guides 30 being exposed to a front side of the MFP 1.

The discharge surface 92A of the discharge tray 92 is provided with the support member 60, the first support portion 70A, and the second support portion 70B. The upper surfaces of these supporters contact the supply tray 91 located at the first position (the rib 91E and the rib 91D), thereby positioning the supply tray 91 in the height direction. The support member 60 supports the front end of the supply tray 91, and the support member 70 supports the rear end of the supply tray 91, thereby accurately positioning the supply tray 91 in the front and rear direction. Furthermore, the first support portion 70A and the second support portion 70B support the rear end of the supply tray 91 in accordance with the shape of the supply tray 91, thereby reliably positioning the supply tray 91. This positioning may reduce malfunctions in which the supply tray 91 is bent downward, even in case where a load is imposed on the supply tray 91 from above.

The support member 60 is formed integrally with the discharge surface 92A and the side wall 92D, and the first support portion 70A and the second support portion 70B are formed integrally with the discharge surface 92A and the side wall 92C. Thus, even if a load is imposed on the supply tray 91 from above, the supply tray 91 is in contact with the support member 60, the first support portion 70A, and the second support portion 70B, so that the supply tray 91 has increased stiffness.

The protrusions 60A, the projections 70C, and the projections 70D are respectively provided on the upper surfaces of the support member 60, the first support portion 70A, and the second support portion 70B. This construction makes it easy to position the supply tray 91 relative to the upper surfaces of the support member 60, the first support portion 70A, and the second support portion 70B.

The rib 91D is provided on the lower surface of the front end portion of the supply tray 91, and the rib 91E is provided on the lower surface of the rear end of the supply tray 91. The rib 91D contacts the upper surface of the second support portion 70B, and the rib 91E contacts the upper surface of the support member 60. With this construction, the ribs 91D, 91E provided on the supply tray 91 increase the stiffness of the supply tray 91.

ALTERNATIVE EMBODIMENTS

While the embodiment has been described above, it is to be understood that the disclosure is not limited to the details of the illustrated embodiment, but may be embodied with various changes and modifications, which may occur to those skilled in the art, without departing from the spirit and scope of the disclosure.

For example, the MFP 1 includes the reading unit 3 and the sheet conveyor 4 in the above-described embodiment, but the present disclosure may be applied to an image scanner having only a scanning function.

Modifications

Figure 11A:
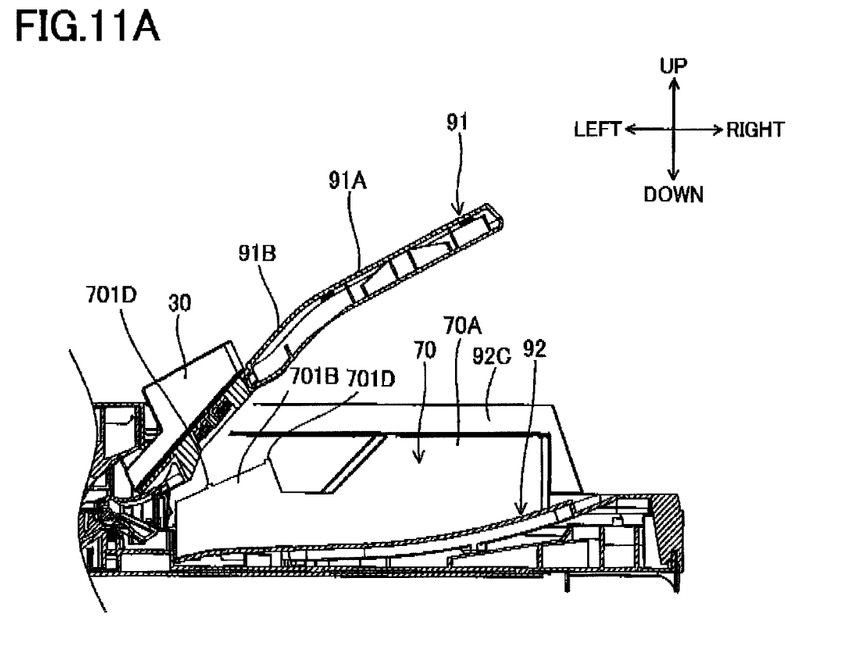
Figure 11B:
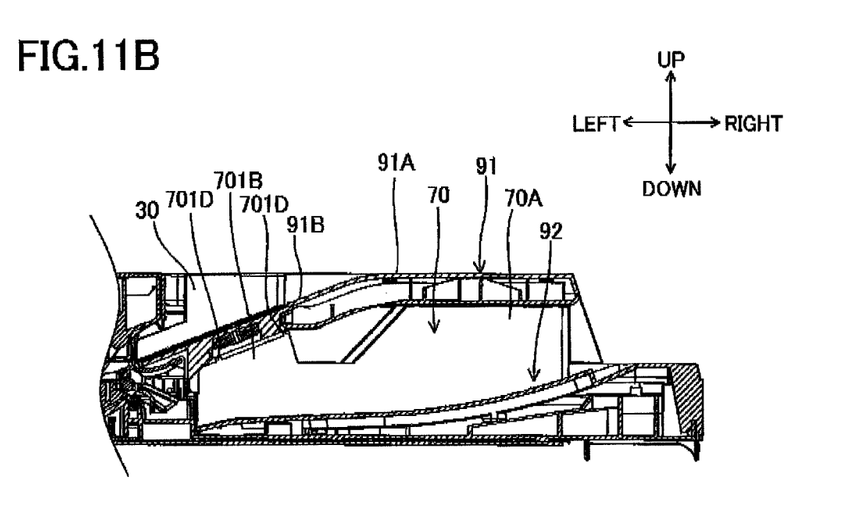

There will be explained modifications of the above-described embodiment. It is noted that the same reference numerals as used in the above-described embodiment are used to designate the corresponding elements of the following modifications, and an explanation of which is dispensed with. FIG. 11A illustrates the supply tray 91 located at the second position. The rib 91D in the above-described embodiment is not provided on the lower surface of the supply tray 91. Instead, an upper end portion of a second support portion 701B is an inclined surface extending in the right and left direction so as to match the shape of the lower surface of the supply tray, specifically, the shape of the lower surface of the second area 91B of the supply tray 91. Protrusions 701D are provided respectively on right and left end portions of the inclined surface of the second support portion 701B. As illustrated in FIG. 11B, when the supply tray 91 is swung to the first position, the inclined lower surface of the second area 91B of the supply tray 91 is brought into contact with the protrusions 701D provided on the second support portion 701B, thereby positioning the lower surface of the second area 91B. The same effects as obtained in the above-described embodiment may be obtained in this modification.

The front cover 93 is divided into the first region X, the second region Z, and the third region Y having different heights in the above-described embodiment. However, the front cover 93 may be divided into only the first region X and the second region Z without the third region. In this construction, the height of an upper end of a downstream portion of the first region X in the conveying direction (which corresponds to the first region X in FIG. 5) is higher than or equal to that of the upper ends of the guides 30. Also, the height of an upper end of an upstream portion of the first region X in the conveying direction (which corresponds to the third region Y in FIG. 5) is lower than that of the upper end of the first region X in FIG. 5. Also, the upstream portion of the first region X in the conveying direction is inclined such that the height of the supply tray 91 at the position corresponding to the starting point P is higher than the height of the starting point P. Also, the upstream portion of the first region X in the conveying direction extends to a position located upstream of the starting point P in the conveying direction. In the case where the first region X is thus constructed, the starting point P of the supply tray 91 overlaps the first region X of the front cover 93 when the opening and closing member 9 is viewed from the front (in the front and rear direction). While the heights of the front cover 93 are not limited to those in the above-described embodiment, the front cover 93 may have any height or heights as long as the portion of the supply tray 91 which corresponds to the starting point P is covered by the front cover 93 from the front. In FIG. 5, the third region Y has the inclined upper end to couple the first region X and the second region Z to each other. However, the third region Y may have an upper end inclined downward from the first region X in a stepped manner to couple the first region X and the second region Z to each other. In this construction, the third region Y at least needs to be provided such that the height of the supply tray 91 at the position corresponding to the starting point P is higher than the height of the starting point P.

Each of the front cover 93 and the rear cover 94 is constituted by the two components in the above-described embodiment but may be constituted by a single component.

In the above-described embodiment, the support member 60 is formed integrally with the discharge surface 92A and the side wall 92D, and the first support portion 70A and the second support portion 70B are formed integrally with the discharge surface 92A and the side wall 92C. However, each of the support member 60, the first support portion 70A, and the second support portion 70B may be formed separately from the corresponding supporters and need not protrude from the discharge surface 92A. For example, each of the support member 60, the first support portion 70A, and the second support portion 70B may have any construction as long as each supporter may support the supply tray 91 located at the first position from below with enough strength and is provided outside a region on which the sheet SH is to be conveyed. The shape of each of the support member 60, the first support portion 70A, and the second support portion 70B is not limited to the shape in which the supporter is elongated in the right and left direction. For example, a plurality of supporters each having a short length in the right and left direction may be provided at different positions.

What is claimed is:

1. A sheet conveyor, comprising:
   a sheet conveyor member configured to convey a sheet in a conveying direction;
   a supporter comprising (i) a support surface disposed upstream of the sheet conveyor member in the conveying direction and configured to support the sheet to be conveyed by the sheet conveyor member and (ii) a guide provided nearer to the sheet conveyor member than an upstream edge of the support surface in the conveying direction, the guide being movable in a widthwise direction perpendicular to the conveying direction, the supporter comprising a first end portion and a second end portion in the widthwise direction, the guide comprising an upstream end portion in the conveying direction; and
   a first cover adjacent to the first end portion of the supporter and extending in the conveying direction,
   wherein the supporter comprises an upstream edge in the conveying direction,
   wherein a first-end upstream end portion of the upstream edge of the supporter corresponds to the first end portion, and a second-end upstream end portion of the upstream edge of the supporter corresponds to the second end portion,
   wherein the first-end upstream end portion is located nearer to the sheet conveyor member than the second-end upstream end portion,
   wherein the first cover comprises a first region and a second region,
   wherein a height of a portion of an upper end of the first region is greater than or equal to that of an upper end of the guide, and the first region extends to a position located upstream of the upstream end portion of the guide in the conveying direction,
   wherein the second region is located upstream of the first region in the conveying direction, and a height of an upper end of the second region is less than that of the upper end of the first region,
   wherein the first-end upstream end portion of the upstream edge of the supporter overlaps the first region of the first cover when viewed in the widthwise direction, and
   wherein a first recess that is recessed away from the guide is formed in an upper surface of the first cover at a position opposed to the guide.

2. The sheet conveyor according to claim 1,
   wherein the first cover comprises a third region that is a portion of the first region and that is adjacent to the second region,
   wherein a height of the third region changes gradually toward the second region, and
   wherein the first-end upstream end portion of the upstream edge of the supporter overlaps the third region of the first cover when viewed in the widthwise direction.

3. The sheet conveyor according to claim 1,
   wherein the support surface of the supporter comprises a first area and a second area,
   wherein the first area is located upstream of the second area in the conveying direction,
   wherein the first area is a surface parallel with an upper surface of the first region of the first cover, and
   wherein the second area is a surface inclined or curved from the first area toward the sheet conveyor member.

4. The sheet conveyor according to claim 3, further comprising a second cover opposed to the first cover, with the supporter interposed therebetween,
   wherein the second cover is adjacent to the sheet conveyor member and the second end portion of the supporter and extends in the conveying direction, and
   wherein an upper surface of the second cover and the first area of the support surface are located at a substantially identical height.

5. The sheet conveyor according to claim 4, further comprising an upper cover that covers an upper portion of the sheet conveyor member,
   wherein downstream end portions of the first cover and the second cover in the conveying direction are adjacent to a downstream end portion of the upper cover in the conveying direction, and
   wherein the upper cover, the upper surface of the first region of the first cover, the upper surface of the second cover, and the first area of the support surface are located at a substantially identical height.

6. The sheet conveyor according to claim 3,
   wherein a cutout is formed through the supporter in a direction perpendicular to the support surface,
   wherein the cutout is formed at an area nearer to the first end portion of the supporter than a center of the supporter in the widthwise direction, and
   wherein a downstream edge of the cutout in the conveying direction is contiguous to the second area of the supporter.

7. The sheet conveyor according to claim 3,
   wherein the supporter comprises a pivot axis at one of a downstream end portion and an upstream end portion of the supporter, which one is nearer to the sheet conveyor member than the other,
   wherein the supporter is pivotable about the pivot axis between a first position at which the supporter supports the sheet and a second position at which the supporter is positioned by pivoting upward from the first position,
   wherein the sheet conveyor member further comprises:
      a discharge surface located below the supporter and configured to support the sheet discharged by the sheet conveyor member;
      two side walls opposed to each other in the widthwise direction, with the discharge surface interposed therebetween; and
      a protrusion extending along the two side walls from an upstream side toward a downstream side in the conveying direction, the protrusion being contactable with the supporter located at the first position,
   wherein the two side walls comprise a first side wall and a second side wall as opposite end portions of the discharge surface in the widthwise direction, and wherein the protrusion comprises: a first protrusion provided along the first side wall; and a second protrusion provided along the second side wall.

8. The sheet conveyor according to claim 7, wherein the second protrusion comprises a first portion extending parallel with the first area of the support surface of the supporter located at the first position.

9. The sheet conveyor according to claim 8, wherein the second protrusion comprises a second portion located under the second area of the support surface, and a height of the second portion from the discharge surface is less than that of the first portion from the discharge surface.

10. The sheet conveyor according to claim 7, wherein the first protrusion comprises a third portion extending parallel with a surface of the supporter, which surface is opposite side of the supporter from the second area of the support surface of the supporter located at the first position.

11. A sheet conveyor comprising:
a sheet conveyor member configured to convey a sheet in a conveying direction;
a supporter comprising (i) a support surface disposed upstream of the sheet conveyor member in the conveying direction and configured to support the sheet to be conveyed by the sheet conveyor member and (ii) a guide provided nearer to the sheet conveyor member than an upstream edge of the support surface in the conveying direction, the guide being movable in a widthwise direction perpendicular to the conveying direction, the supporter comprising a first end portion and a second end portion in a widthwise direction, the guide comprising an upstream end portion in the conveying direction; and
a first cover adjacent to the first end portion of the supporter and extending in the conveying direction;
wherein the supporter comprises an upstream edge in the conveying direction,
wherein a first-end upstream end portion of the upstream edge of the supporter corresponds to the first end portion, and a second-end upstream end portion of the upstream edge of the supporter corresponds to the second end portion,
wherein the first-end upstream end portion is located nearer to the sheet conveyor member than the second-end upstream end portion,
wherein the first cover comprises a first region and a second region,
wherein a height of a portion of an upper end of the first region is greater than or equal to that of an upper end of the guide, and the first region extends to a position located upstream of the upstream end portion of the guide in the conveying direction,
wherein the second region is located upstream of the first legion in the conveying direction, and a height of an upper end of the second region is less than that of the upper end of the first region,
wherein the first-end upstream end portion of the upstream edge of the supporter overlaps the first region of the first cover when viewed in the widthwise direction,
wherein the support surface of the supporter comprises a first area and a second area,
wherein the first area is located upstream of the second area in the conveying direction,
wherein the first area is a surface parallel with an upper surface of the first region of the first cover,
wherein the second area is a surface inclined or curved from the first area toward the sheet conveyor member, wherein the sheet conveyor member further comprises a second cover opposed to the first cover, with the supporter interposed therebetween,
wherein the second cover is adjacent to the sheet conveyor member and the second end portion of the supporter and extends in the conveying direction,
wherein an upper surface of the second cover and the first area of the support surface are located at a substantially identical height, and
wherein a second recess that is recessed away from the guide is formed in the upper surface of the second cover at a position opposed to the guide.

12. The sheet conveyor according to claim 11, wherein the first cover comprises a third region that is a portion of the first region and that is adjacent to the second region,
wherein a height of the third region changes gradually toward the second region, and
wherein the first-end upstream end portion of the upstream edge of the supporter overlaps the third region of the first cover when viewed in the widthwise direction.

13. The sheet conveyor according to claim 11, further comprising an upper cover that covers an upper portion of the sheet conveyor member,
wherein downstream end portions of the first cover and the second cover in the conveying direction are adjacent to a downstream end portion of the upper cover in the conveying direction, and
wherein the upper cover, the upper surface of the first region of the first cover, the upper surface of the second cover, and the first area of the support surface are located at a substantially identical height.

14. The sheet conveyor according to claim 11, wherein a cutout is formed through the supporter in a direction perpendicular to the support surface,
wherein the cutout is formed at an area nearer to the first end portion of the supporter than a center of the supporter in the widthwise direction, and
wherein a downstream edge of the cutout in the conveying direction is contiguous to the second area of the supporter.

15. A sheet conveyor comprising:
a sheet conveyor member configured to convey a sheet in a conveying direction;
a supporter comprising (i) a support surface disposed upstream of the sheet conveyor member in the conveying direction and configured to support the sheet to be conveyed by the sheet conveyor member and (ii) a guide provided nearer to the sheet conveyor member than an upstream edge of the support surface in the conveying direction, the guide being movable in a widthwise direction perpendicular to the conveying direction the supporter comprising a first end portion and a second end portion in a widthwise direction, the guide comprising an upstream end portion in the conveying direction; and
a first cover adjacent to the first end portion of the supporter and extending in the conveying direction,
wherein the supporter comprises an upstream edge in the conveying direction,
wherein a first-end upstream end portion of the upstream edge of the supporter corresponds to the first end portion, and a second-end upstream end portion of the upstream edge of the supporter corresponds to the second end portion, wherein the first-end upstream end portion is located nearer to the sheet conveyor member than the second-end upstream end portion, wherein the first cover comprises a first region and a second region, wherein a height of a Portion of an upper end of the first region is greater than or equal to that of an upper end of the guide, and the first region extends to a position located upstream of the upstream end portion of the guide in the conveying direction, wherein the second region is located upstream of the first region in the conveying direction, and a height of an upper end of the second region is less than that of the upper end of the first region, wherein the first-end upstream end portion of the upstream edge of the supporter overlaps the first region of the first cover when viewed in the widthwise direction, wherein the supporter comprises a pivot axis at one of a downstream end portion and an upstream end portion of the supporter, which one is nearer to the sheet conveyor member than the other, wherein the supporter is pivotable about the pivot axis between a first position at which the supporter supports the sheet and a second position at which the supporter is positioned by pivoting upward from the first position, and wherein the sheet conveyor member further comprises:
  a discharge surface located below the supporter and configured to support the sheet discharged by the sheet conveyor member;
  two side walls opposed to each other in the widthwise direction, with the discharge surface interposed therebetween; and
  a protrusion extending along the two side walls from an upstream side toward a downstream side in the conveying direction, the protrusion being contactable with the supporter located at the first position.

16. The sheet conveyor according to claim 15,
wherein the discharge surface comprises a discharge region on which the sheet is to be discharged,
wherein the protrusion is provided outside the discharge region, and
wherein the protrusion protrudes from the discharge surface toward the supporter located at the first position.

17. The sheet conveyor according to claim 15, wherein the protrusion is formed integrally with at least one of the two side walls.

18. The sheet conveyor according to claim 15, wherein the supporter comprises a rib protruding toward the discharge surface from a surface of the supporter which is located on an opposite side of the supporter from the support surface, and a lower end of the rib is contactable with the protrusion.

19. The sheet conveyor according to claim 15, further comprising a projection projecting toward the supporter located at the first position,
wherein the projection is provided on each of an upstream end portion and a downstream end portion of an upper surface of the protrusion in the conveying direction.

* * * * *

UNITED STATES PATENT AND TRADEMARK OFFICE
CERTIFICATE OF CORRECTION

PATENT NO. : 9,723,160 B2  
APPLICATION NO. : 15/133491  
DATED : August 1, 2017  
INVENTOR(S) : Tianjin Xie et al.

It is certified that error appears in the above-identified patent and that said Letters Patent is hereby corrected as shown below:

On the Title Page

Item (57), Abstract:
Please change: "and extends to a position located upstream of an upstream," to -- and extends to a position located upstream of an upstream --

In the Claims

Column 15, Line 34, Claim 11:
Please change: "supporter and extending in the conveying direction;" to -- supporter and extending in the conveying direction, --

Column 16, Line 53, Claim 15:
Please change: "direction the supporter comprising a first end portion" to -- direction, the supporter comprising a first end portion --

Column 17, Line 6, Claim 15:
Please change: "wherein a height of a Portion of an upper end of the first" to -- wherein a height of a portion of an upper end of the first --

Signed and Sealed this  
Twentieth Day of February, 2018

Andrei Iancu  
*Director of the United States Patent and Trademark Office*